Figure 1:
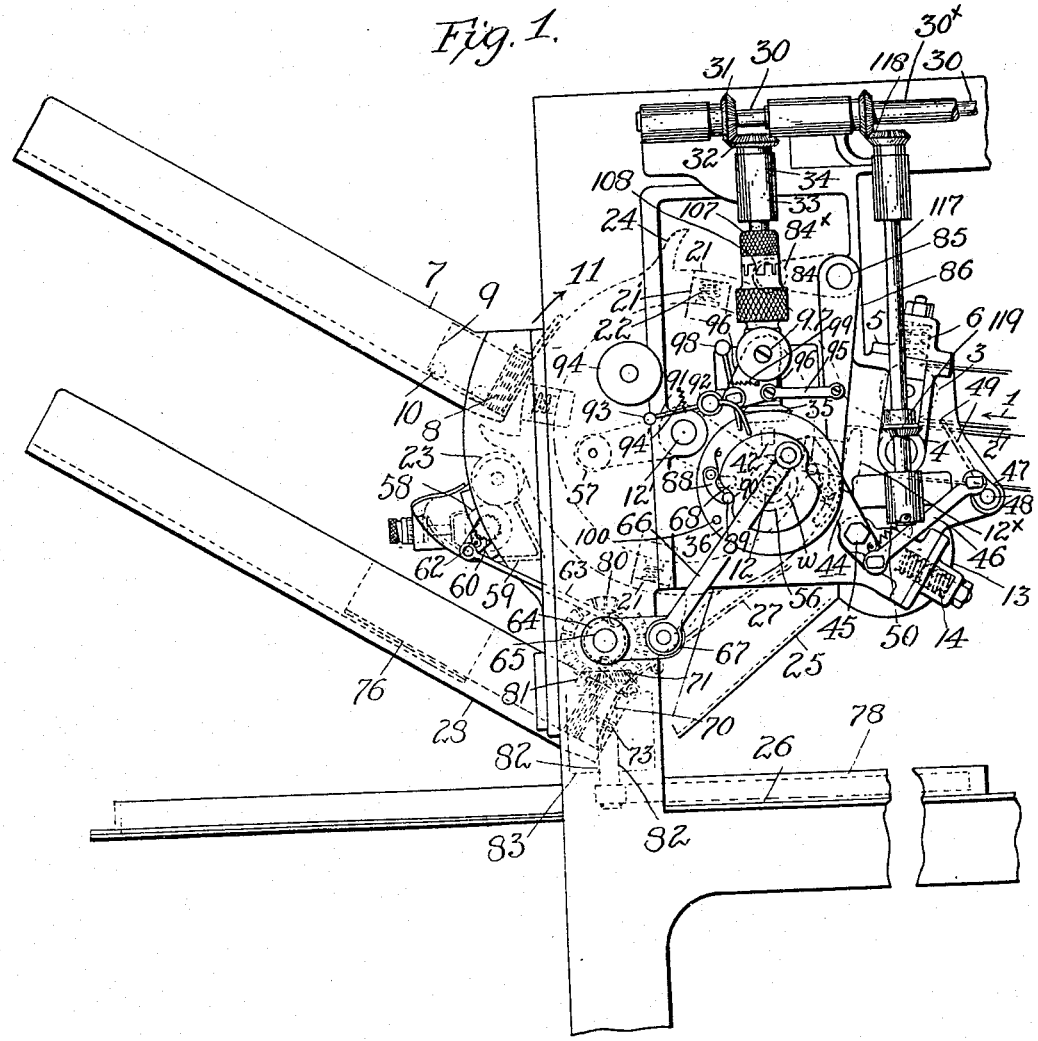

No. 826,054.

PATENTED JULY 17, 1906.

C. OWENS & U. G. LEE.
ADDRESSING MACHINE.
APPLICATION FILED AUG. 1, 1905.

6 SHEETS—SHEET 1.

Attest
O. S. Middleton
Edward N. Sarton

Inventors
Charles Owens
Ulysses G. Lee
By
Spear, Middleton, Donaldson & Spear
Attys.

No. 826,054. PATENTED JULY 17, 1906.
C. OWENS & U. G. LEE.
ADDRESSING MACHINE.
APPLICATION FILED AUG. 1, 1905.
6 SHEETS—SHEET 2.

Attest
Edward N. Sarton
O.S. Middleton

Inventors
Charles Owens
Ulysses G. Lee
by
Spear, Middleton, Donaldson & Spear
Attys.

No. 826,054. PATENTED JULY 17, 1906.
C. OWENS & U. G. LEE.
ADDRESSING MACHINE.
APPLICATION FILED AUG. 1, 1905.
6 SHEETS—SHEET 3.
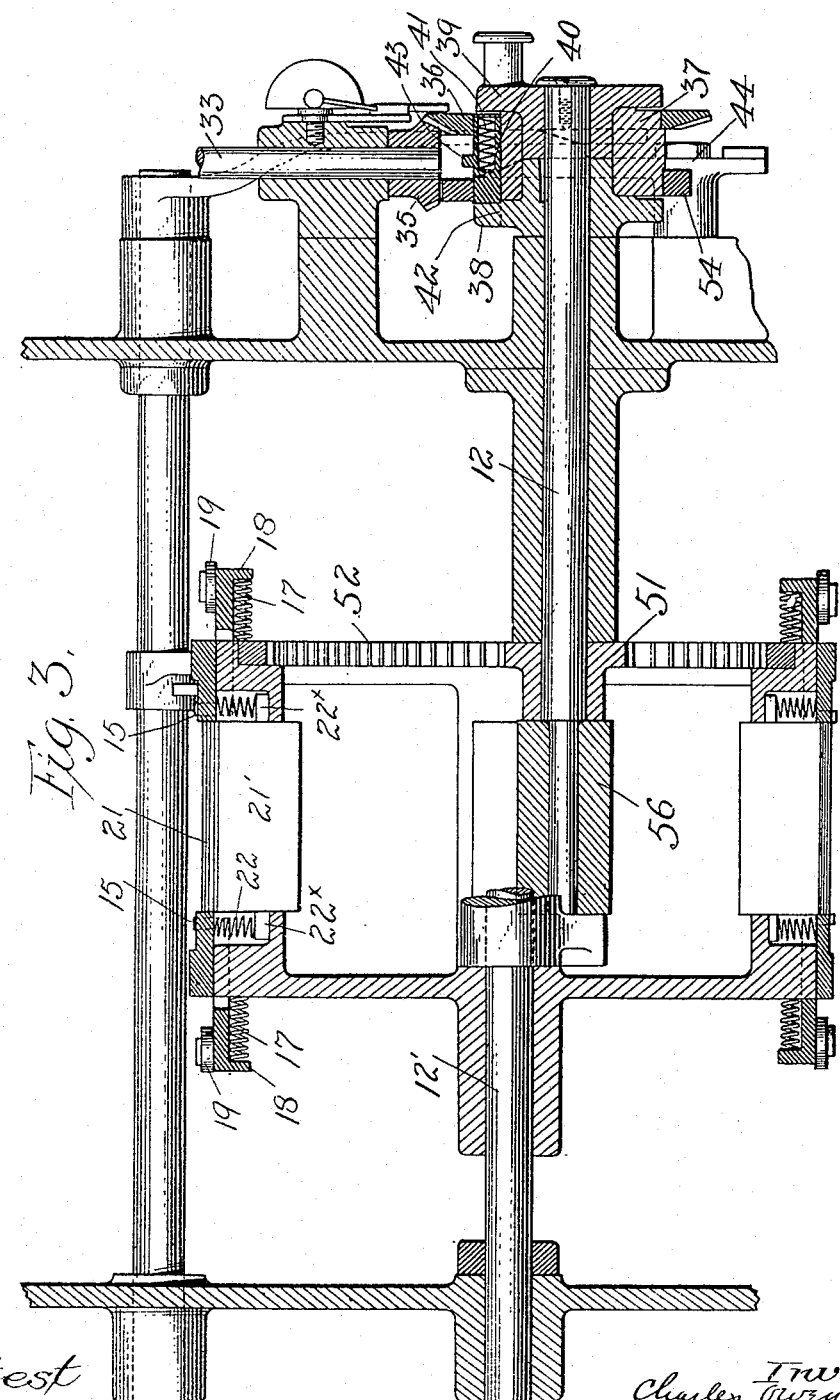

No. 826,054. PATENTED JULY 17, 1906.
C. OWENS & U. G. LEE.
ADDRESSING MACHINE.
APPLICATION FILED AUG. 1, 1905.
6 SHEETS—SHEET 4.
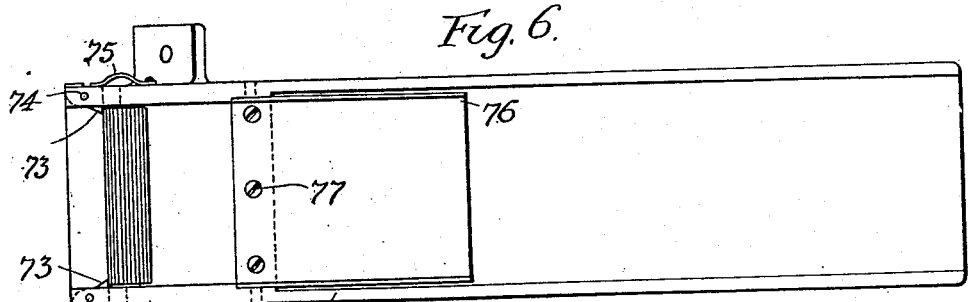
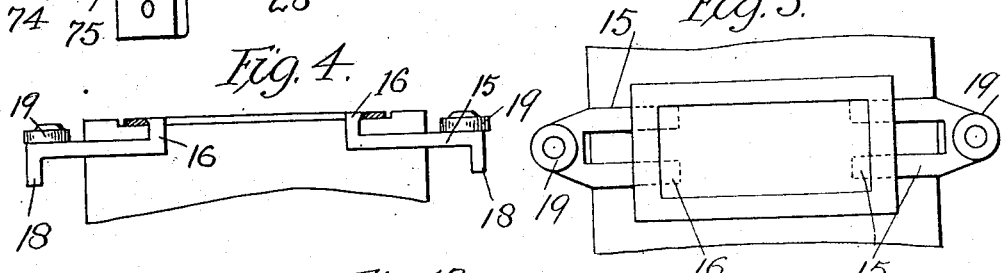
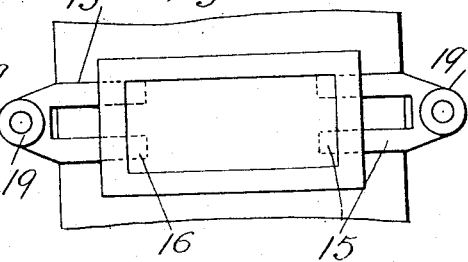
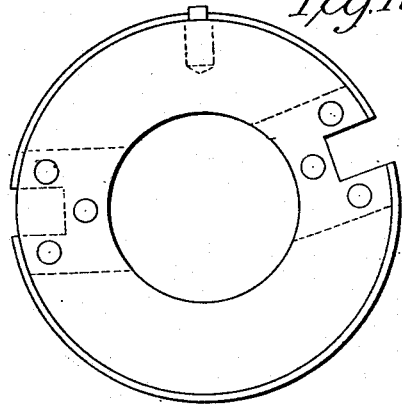
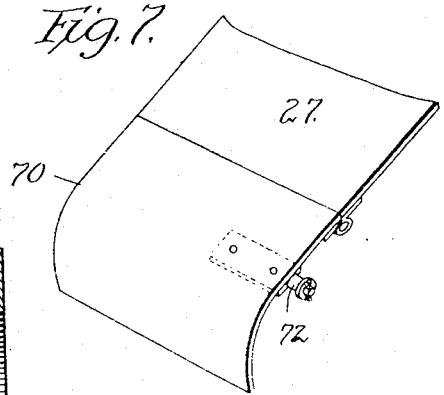
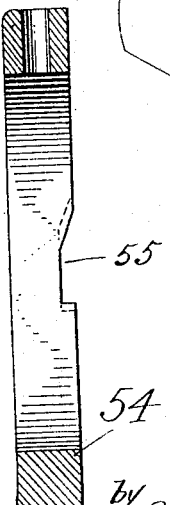

No. 826,054. PATENTED JULY 17, 1906.
C. OWENS & U. G. LEE.
ADDRESSING MACHINE.
APPLICATION FILED AUG. 1, 1905.
6 SHEETS—SHEET 5.
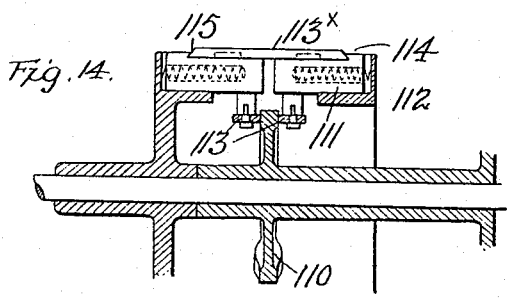
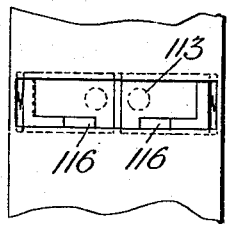
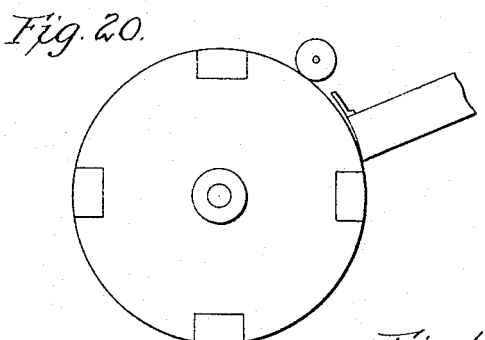
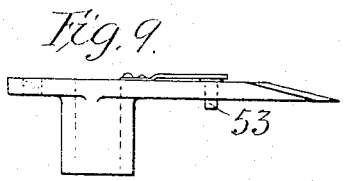
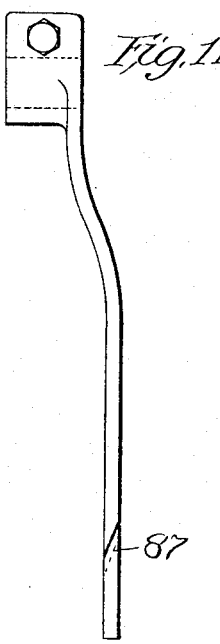
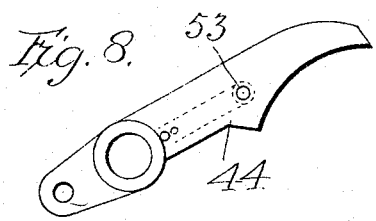

No. 826,054. PATENTED JULY 17, 1906.
C. OWENS & U. G. LEE.
ADDRESSING MACHINE.
APPLICATION FILED AUG. 1, 1905.
6 SHEETS—SHEET 6.
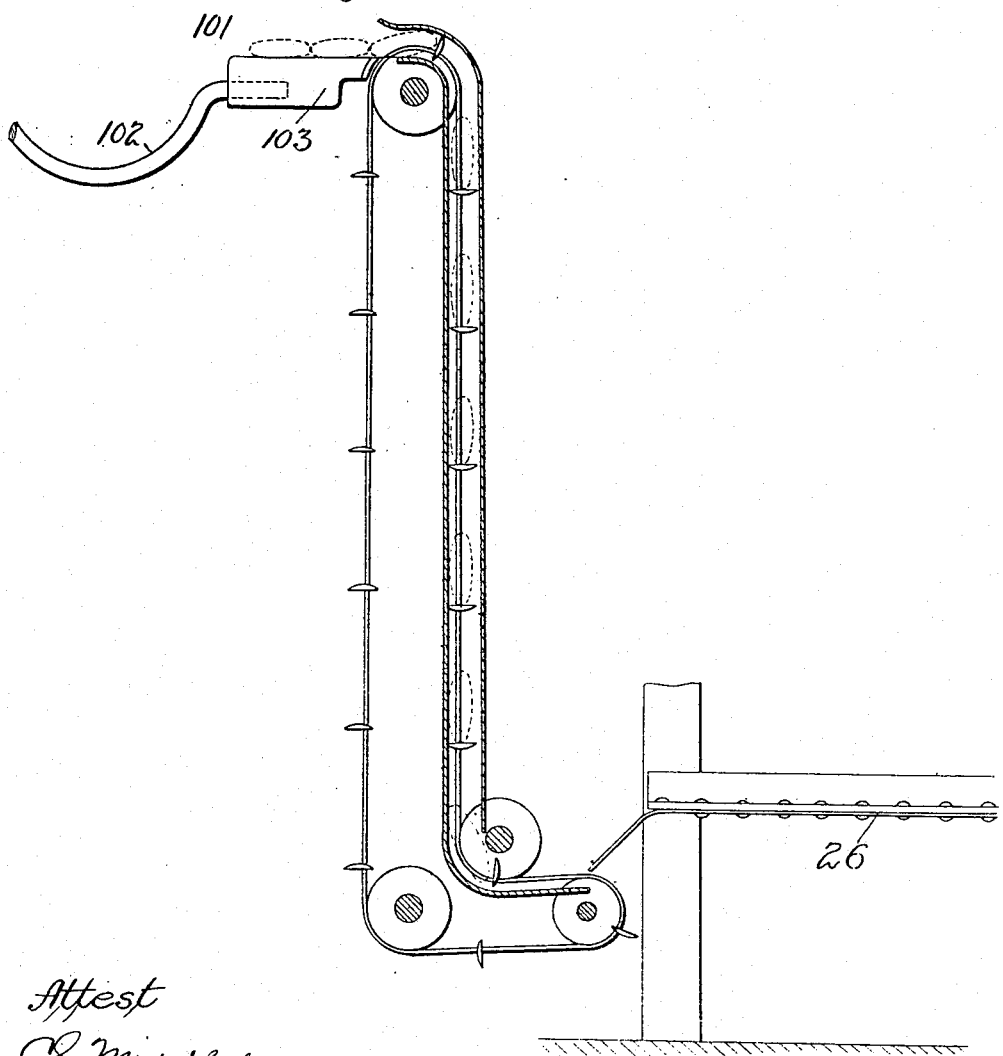

UNITED STATES PATENT OFFICE.

CHARLES OWENS AND ULYSSES GRANT LEE, OF CHATTANOOGA, TENNESSEE; SAID LEE ASSIGNOR TO DWIGHT P. MONTAGUE, OF CHATTANOOGA, TENNESSEE.

ADDRESSING-MACHINE.

No. 826,054.     Specification of Letters Patent.     Patented July 17, 1906.

Application filed August 1, 1905. Serial No. 272,267.

*To all whom it may concern:*

Be it known that we, CHARLES OWENS and ULYSSES GRANT LEE, citizens of the United States, residing at Chattanooga, Tennessee, have invented certain new and useful Improvements in Addressing-Machines, of which the following is a specification.

The invention relates to addressing-machines of the general class in which a series of stencils, type-plates, or the like are fed to the machine in unison with the magazine to be addressed, so that the said stencils or type-plates will associate themselves individually with the magazines successively fed to the machine to apply the address thereto.

While we refer in this description to "magazines," it will be understood that the machine may be adapted to address papers or articles of any character susceptible of being handled in substantially the same manner as a magazine.

In carrying out our invention we provide a machine in which the operation of the stencil-feeding means and the impression or printing means will depend upon the presence of the magazine or paper at the proper point or position to be addressed, so that when the said magazine is presented to have the address printed thereon the said parts of the machine will be set in operation; but if the magazine or paper fails to feed or the supply becomes exhausted there will be no operation of the stencil-feeding means or of the impression or printing means. We have included in our machine also a signal or bell designed to give notice when the supply of stencils has become exhausted or in failing to feed. We have further included means for automatically separating the parcels or magazines as addressed into separate clubs or towns, counties, or States by means of special stencils inserted among the series of stencils, and in this connection we have provided a signal for calling attention of the operator when the change occurs from one club or series of magazines to another.

In delivering the magazines from the addressing-machine we arrange to expose them, address side up, in a convenient position to be inspected before they are packed up or placed in the sacks.

The invention consists in the features and combination and arrangement of parts hereinafter described, and particularly pointed out in the claims.

Figure 2:
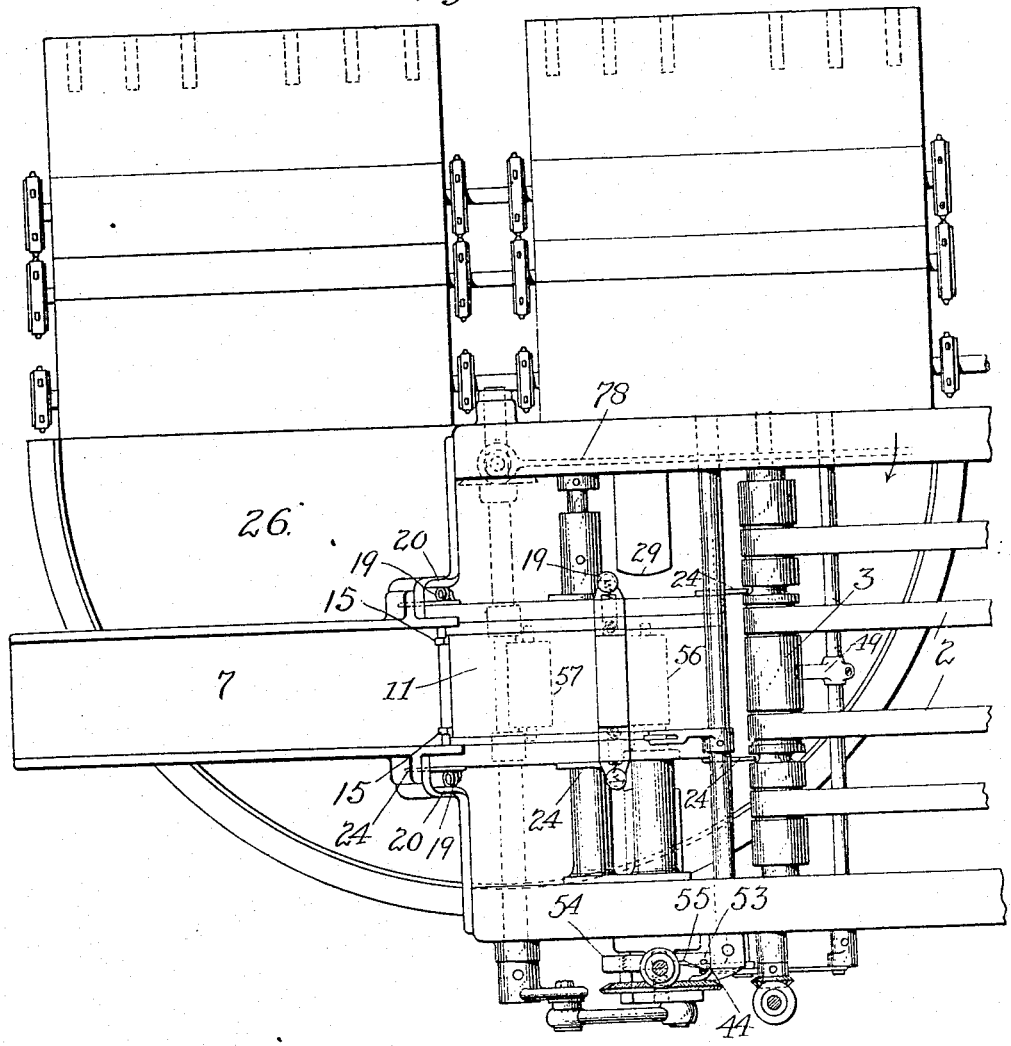

In the accompanying drawings, Figure 1 is a side view of an addressing-machine embodying our invention. Fig. 2 is a plan view of the machine of Fig. 1. Fig. 3 is a sectional view through the stencil carrying and printing drum, the said section being taken longitudinally of the shaft of said drum and partly along the driving-shaft, the controlling devices on said latter shaft also being in section. Figs. 4 and 5 are detail views relating to the stencil-gripping fingers or dogs carried by the drum. Fig. 6 is a detail view of a trough into which the stencils are delivered after leaving the carrying-drum. Fig. 7 is a view of a detail relating to means for delivering the stencils into the trough from the drum. Figs. 8 and 9 are detail views of a clutch or wedge lever. Figs. 10 and 11 are detail views of another clutch or wedge lever. Fig. 12 is a detail view of a clutch-disk. Fig. 13 is a sectional view in detail of a ring for controlling one of the clutch-levers. Fig. 14 is a detail sectional view of a modification in which type-plates are carried by the drum instead of stencils. Fig. 15 is a detail plan view of parts shown in Fig. 14. Fig. 16 is a detail view of one of the type-plates. Fig. 17 is a diagrammatic view of means for elevating the magazines from the table of the machine and delivering the same at an elevated point. Figs. 18 and 19 are detail views of means whereby the mail-bags may be held for receiving the magazines, and Fig. 20 is a diagrammatic view of the drum and parts associated therewith for use with type-plates instead of stencils.

The magazines to be addressed are fed to the machine in the direction of the arrow 1, Fig. 1, between endless tapes 2, passing around rollers 3, 4, held in any suitable bearings in the frame 5, the journal of the upper roller being spring-pressed, as at 6.

The stencils are fed to the machine by an inclined trough 7, in which the stencils are placed, as shown at 8, perpendicular to the bottom of the trough, and are fed down automatically by a weight 9, having rollers 10, running on the bottom of the trough.

The stencil carrying and printing drum is shown at 11, this being supported loosely on a shaft 12' and driven through gearings 51 52 from the drive-shaft 12, which in turn is driven, as will be hereinafter described. The magazines as they emerge from between the belts 2 strike the smooth surface of the stencil-drum 11 and are projected upwardly and then drop into the position indicated in dotted lines at 12×, Fig. 1, with its lower edge resting upon a pressure roll or platen 13, which is journaled in the frame and has its bearing under tension of springs, such as is shown at 14. This pressure-roll has its periphery close to the periphery of the stencil-carrying drum, and in passing between this roll and the stencil-carrying drum the magazine receives the address from the stencil and the impression means carried by the stencil-drum. The stencils are taken from the trough 7 one by one by dogs or gripper-fingers 15, carried by the drum 11, the said fingers being arranged in pairs, as shown in Figs. 4 and 5, the members of each pair being located opposite each other and near opposite sides of the stencil-drum. They are adapted to slide parallel with the axis of the drum, and their outwardly-extending fingers or points 16 are arranged to grasp the stencils on their inner edges, as shown at Fig. 4. The stencil-arms are controlled in their movements by springs 17, arranged, as shown in Fig. 3, between the sides of the stencil-drum and the flanges 18 on the gripper arms or fingers 15. These springs tend constantly to press the gripper-fingers outwardly to grasp the stencils by their inner edges, and for pressing the fingers inwardly they are provided with rollers 19, which ride upon cams 20 on the frame, Fig. 2, these cams being located adjacent the trough 7, so that as the stencil-drum brings the gripper-fingers around these cams will press the fingers inwardly. The stencil will then be forced against the drum by the weight 9, and immediately upon passing these cams 20 the gripper-fingers or dogs will move outwardly and grasp the stencil to carry it around to the opposite side of the machine for making the impression.

An inking-pad is associated with each pair of stencil-gripping fingers or dogs, as indicated at 21. This pad is carried by a block 21', Figs. 1 and 3, pressed normally inwardly by springs 22, bearing against lugs 22× on the block. The inking-pad receives its ink from an inking-roller 23 just before it arrives at the trough 7, as will be hereinafter described.

In order to aid in moving the magazine positively between the pressure-roll 13 and the stencil-drum 11 for the printing action, we provide arms 24 on the stencil-drum slightly in rear of the position of the inking-pads and adapted, as shown in Fig. 1, to engage the upper edge of the magazine and thrust it into the bite of the stencil-drum and pressure-roll. The relation of the parts is such that the center of the magazine as forced between the pressure-roll and stencil-drum will be directly opposite the inking-pad, over which pad the stencil is held by the gripper arms or fingers, as above described, so that the impression will be made through the stencil onto the magazine as it is passing between the pressure-roll and the stencil-drum. The magazine will then drop into a chute 25 to be delivered onto a table 26, while the stencil will be delivered onto a plate 27, inclining downwardly, along which the stencil will pass and be deposited in a trough 28, arranged at an inclination, the said stencils being set perpendicularly to the bottom of this trough.

For releasing the stencils after passing the impression-point we provide cams 29, Fig. 2, against which the rollers 19 of the gripper arms or fingers ride to press the said fingers inwardly and disengage their inner ends from the inner edges of the stencils. Power is transmitted to the machine through a shaft 30, Fig. 1, having beveled gear 31, meshing with a bevel-gear 32 on an upright shaft 33, journaled in bearings 34 and having at its lower end a beveled gear 35, meshing with a beveled gear 36, carried by a drum 37, turning loosely on the hubs of a disk 38 and a crank-disk 39. The disk 38 is fixed to the drive-shaft 12, while the crank-disk 39 is loose on the said shaft. The drum 37 carries a clutch pin or pins 40, pressed by a spring 41 to engage a notch 42 in the clutch-disk 38. The clutch-pin carries a projection 43, and the position of the clutch-pin is controlled by a wedge or clutch lever 44, the inclined or wedge portion of which is adapted to act on the pin 43 when the clutch is allowed to remain in line with the path of said pin as the drum 37 rotates constantly.

The clutch-lever is shown in detail in Figs. 8 and 9, and, as shown in Fig. 1, it is pivoted to the frame at 45 and is connected by a link 46 to a crank-arm 47 on a shaft 48, journaled in the frame, the said shaft having a finger or arm 49 extending upwardly in the path of the magazines as they are fed to the machine between the upper and lower pairs of endless tapes or belts.

As long as magazines are being fed to the machine the clutch or wedge lever will be held in inoperative position—that is, out of the path of the projection 43 of the clutch-pin 42—because the said magazine in passing to the machine will press upon the arm 49, and this through the link 46 will swing the clutch-lever and withdraw its wedge-shaped end from the path of the clutch-pin; but when the feed of the magazine fails and no pressure is exerted on the arm 49 a spring 50, connected with the clutch-lever and the frame, will swing the said clutch-lever so as to engage the projection 43 of the clutch-pin as this comes around in the revolution of the drum 37, and thus retract the clutch-pin from the clutch-disk 38, whereupon the stencil-drum will be arrested and the feed of the stencils and the operation of printing mechanism will cease; but the rotary carrier will be started again when the next magazine is fed thereto by the action of said magazine on the controlling means. The parts are timed so that the shaft 12 makes one revolution for each magazine, and the revolution of this shaft, as before stated, is transmitted to the stencil-drum through the gear 51, fixed on the shaft, and the internal gear 52 of the stencil-drum and the gearing is proportioned so that for each revolution of the shaft 12 the stencil-drum will rotate a distance corresponding to that between the inking-pads or stencil-gripping means.

When the clutch-lever 44 is withdrawn from the path of the clutch-pin or rather its projection 43, it is prevented from springing back into its operative or effective position after the magazine has passed the arm 49 by means of a pin 53, carried by the said clutch-lever riding upon the surface of a ring 54, fixed and rotating with the drum 37. The ring is cut away at the point 55, so that when this cut-away portion is brought around to the pin 53 and there is no magazine being fed to press on the arm 49 the clutch-lever will be free to move with its wedge end inwardly toward the shaft, and thus into the path of the clutch-pin 42; but if a magazine is being fed the arm 49 will be pressed upon and the clutch-lever will still be held retracted, and the recess 55 will then pass without effect beneath the pin 53, and said pin will then continue to ride upon the periphery of the ring 54. The inking-pad may consist of soft rubber or other material applied as a facing to a suitable block which is pressed by the spring 22.

The necessary pressure for the impression is effected by a roller 56, mounted on the end of the driving-shaft 12, Figs. 1, 2, and 3. This roller has its axis in the plane passing through the axis of the shaft 12 and the axis of the pressure-roller 13, and the impression-blocks by riding over the periphery of this roller are forced outwardly to press the inking-pads against the stencils and to force the ink through the openings in the said stencils onto the magazine. The inking-blocks are also forced out on the opposite side of the machine by another roller 57, so that the inking-pad will be made to contact with the inking-roller 23. This inking-roller is supplied with ink from a fountain-roller 58, arranged in a fountain 59, supported on a frame, the said roller having a ratchet 60 operated by a pawl 62 on an arm turning on the axis of the fountain-roller, the said arm being connected by a link 63 with a crank-arm 64 on a shaft 65, which is operated from the crank-disk 39 by means of a link or pitman 66, connecting with the arm 67. This crank-disk 39 is driven from the rotary drum 37 by a clutch-pin 68, the said clutch-pin being withdrawn to release the crank-disk from the rotary drum at intervals, as will be hereinafter described. The stencils when dropped into the trough 28 are pushed upwardly against the pile of stencils already in the said trough by means of a plate 70, which, as shown in Figs. 1 and 7, is pivoted to the lower end of the inclined plate 27. This plate or leaf 70 is given an oscillating movement from the arm 64 on the rock-shaft 65 by means of a link 71, which is connected with the arm 64 at one end and with the leaf at the other end by means of a pin 72, extending from the edge of the said leaf, as shown in Fig. 7. The stencils when pushed forward against the pile are held by dogs or detents 73, as shown in Fig. 6, the detents being pivoted to the walls of the trough at 74 and being pressed by springs 75. The leaf 70, as will be understood from the above, merely oscillates at the lower end of the trough and pushes the stencils upwardly one by one along the trough 28. Within this trough a projection 76 is provided, which is also of trough form, leaving a crevice beneath its bottom and between its sides and the side of the main trough. This projection or supplemental trough 76 is screwed to the main trough at 77, and a removable trough (not shown) is placed in the main trough, with its sides in the crevices mentioned, so that the stencils as they are pushed along the supplemental trough 76 will pass into the removable trough, and when this is filled it may be removed and the stencils packed away in proper order for further use. By the arrangement just described the removable trough, in effect, telescopes with the main and supplemental trough, and thus no abrupt shoulders or obstructions are presented which might prevent the proper discharge of the stencils from the machine into the removable trough. By having the supplemental trough or projection 76 of considerable length it will allow time for the withdrawal of the removable trough filled with stencils and the replacing of an empty trough.

As before stated, the magazines drop through a chute 25 onto a table 26. This is of semicircular form, Fig. 2, and is swept by a distributing-lever 78. Supposing the magazine to drop upon the plate or table, with the distributing-lever in the position shown in dotted lines in Fig. 2, it would be swept off from the table by the motion of the distributing-arm from right to left in the arrow direction. Should, however, the distributing-arm be at the left-hand end of its sweep when the magazine falls upon the table, the said magazine would be swept therefrom by the movement of the distributing-arm from left to right. It will thus be seen that the magazine may be discharged at various points, and in the present instance we have shown two discharge-points, the object here being to separate the addressed magazines which are intended for different localities, such as different States, counties, &c.

The distributing-arm is operated so as to oscillate from the crank-disk 39 through the rock-shaft 65, before described, which rock-shaft carries a beveled gear 80, Fig. 1, meshing with a beveled gear 81 on a shaft 82, adapted to rock in bearings 83, which shaft at its lower end has the distributing-arm fixed thereto. The change in the delivery is effected by means of an extra-thick stencil, which is placed in the series of stencils between those intended for one locality and those following, which are intended for a different locality. This extra-thick stencil is picked up from the trough 7 by the gripper fingers or arms 15, before described, and, like the addressing-stencils, it is carried around by the drum. As the extra-thick stencil passes beneath a roller $84^\times$, Fig. 1, it raises the same, together with the arm 84, carrying the said roller, which arm is fixed to a shaft or pin 85, journaled in the frame 81, which pin or shaft also carries the clutch-lever 86, said clutch-lever having a wedge-shaped end at 87, Figs. 10 and 11, so that when this wedge-shaped end of the lever is thrown inwardly toward the driving-shaft 12 by the lifting of the roller $84^\times$, riding on the extra-thick stencil, the said wedge-shaped end will lie in the path of the clutch-pin 68, which connects the crank-disk 39 with the driving-drum 37, and the said crank-disk will therefore be released from the driving-drum and will be allowed to remain stationary for one-half a revolution, when the clutch-pin 68 will again spring into a notch in the said crank-disk, thus losing one sweep or one action of the delivery-arm, so that on the next sweep of this arm, or, in other words, its movement from left to right, it will sweep the magazine from off the table, and thus deliver it into a different sack or pile from that into which the arm formerly delivered the magazine.

While the change in the delivery takes place levers 88, carried pivotally by the constantly-rotating gear-wheel 36, will be thrown outwardly at their free ends, because pins 89 on the said levers 88 will ride upon cam portions 90 of the crank-disk, and these pins 89 will be brought into line with the end of an arm 91, pivoted at 92 to the frame and carrying a bell-hammer 93, adapted to act on a bell 94, which action takes place to give the signal when the pin 89 contacts with and releases the arm 91, allowing a spring 94', Fig. 1, to draw the hammer against the bell. This signal will notify the operator of the change in the delivery. We employ the same roller or detector $84^\times$ and levers 84 86 for giving a signal when there is no stencil being carried by the drum 11 beneath the roller $84^\times$. For this purpose the lever 86 is connected by a link 95 with a bracket or plate 96, suitably pivoted to the frame at 97 and carrying a bell-hammer 98. This is pressed in one direction by a spring 99. When no stencil is passing beneath the roller $84^\times$, the said roller will drop and through the levers 84 86 will swing the bracket or plate 96 so as to bring the end of the bell-hammer 98 into the path of pins 100, carried by the constantly-rotating gear-wheel 36. In this manner a signal will be given when the drum is devoid of stencils. It will be noticed that the magazine falls upon the table 26 with the addressed side presented upwardly and is swept off of the said table in that position. Any suitable means may be provided for receiving the magazines—such, for instance, as a mail-bag—or an elevator device, such as is shown in Fig. 17, may be employed, which elevates the magazines to a delivery-point 101, from which the magazines fall into suitable curved arms 102, which are inserted in openings in the elevated table 103. In passing over this table 103 the magazines still have their address side presented upwardly, and they may be inspected at this point. If it is desired to discharge the addressed magazines into mail-bags, the device shown in Fig. 18 may be employed, which consists of a plate 104, having a projection 105 to be inserted in one of the openings in the table 103, a pair of said plates being preferably used for each mail-bag, one on each side, and serving as spreaders for the said bags, which may be hung upon hooks, as at 106.

As shown in Fig. 1, a clutch 108 is arranged in the vertical shaft 33 for the purpose of timing the operation of the machine above described with other parts which may be driven in unison or in a certain relation as to time with the parts of the addressing-machine.

It will be understood that as long as the magazine or papers continue to be fed to the stencil-carrying drum the said drum through the driving mechanism above described will remain in constant rotation.

It will be understood that the stencils of ordinary thickness will not have any effect upon the roller $84^\times$ and the mechanism controlled thereby to detach the crank-disk 39 from the driving-drum 37.

Instead of using stencil-plates metal plates having type-surfaces may be employed, and when so used the rollers 56 and 57 and the supporting means therefor may be dispensed with, as may also the inking-pads and the devices associated immediately therewith. The arrangement for use in connection with the type-plates is shown more particularly in Figs. 14 and 15. A stationary cam 110 is mounted on the center shaft, and sliding dogs 111, pressed inwardly by springs 112 and outwardly by rollers 113, riding on the lateral faces of the cam 110, serve to grip and release the type-plates, one of which is shown at 113×, the said dogs having gripping-points or teeth 114 and the type-plates having beveled side edges, as at 115. The dogs are separated from each other at the trough like that formerly described at 7, and the type-plate is carried out of the trough by raised projections 116, carried around by the drum, and as soon as this occurs the dogs are released and spring toward each other to grip the type-plate by its edges, when the type-plate has passed the impression-point and arrives over the inclined plate 27, and cam 110 separates the dogs and releases the type-plate in a manner similar to that above described in connection with the stencils.

It will be understood that the inking-roller instead of being placed in advance of the trough 7 is placed at any suitable point between the said trough and the impression-point. This is indicated diagrammatically in Fig. 20.

The lower one of the rolls 3 4, about which pass the carrier tapes or bands for the magazines, is driven positively from the shaft 30× through a shaft 117 and bevel-gearing at 118 119.

It will be understood that the rotary carrier moves continuously so long as the magazines are fed thereto, but becomes intermittent when the feed of magazines becomes irregular. It is therefore at times a continuously-rotating carrier and at times a step-by-step carrier, and it will also be understood that the machine is started from a position of rest by a magazine when fed thereto.

We claim—

1. In an addressing-machine, a rotary carrier for the printing-plates or stencils, means for automatically conveying and discharging the magazines against the periphery of the rotary carrier and in a direction substantially diametrically thereof and impression means to receive the said magazines and stencils, said impression means being adjacent the periphery of the carrier, and the mpression being made in the passing of the stencil and magazine between the carrier and the impression means substantially as described.

2. In an addressing-machine, a rotary carrier for the printing-plates or stencils, means for automatically carrying the magazines to the periphery of the rotary carrier and projections extending outwardly from the periphery of the carrier to move the magazine as discharged thereto, and impression means, the said projections on the carrier forcing the magazine between the carrier and the impression means, substantially as described.

3. In an addressing-machine, a rotary carrier for the printing-plates or stencils, means for automatically conveying and discharging the magazines upon the rotary carrier, a platen below the discharge-point of the magazine onto which the magazine drops and between which and the surface of the carrier the magazine passes to receive the impression, substantially as described.

4. In an addressing-machine, a rotary carrier for the printing-plates or stencils, means for automatically conveying and discharging the magazines upon the rotary carrier, a platen below the discharge-point of the magazine onto which the magazine drops and between which and the surface of the carrier the magazine passes to receive the impression, and means on the rotary carrier for moving the magazine between itself and the impression means, substantially as described.

5. In combination in an addressing-machine, a rotary carrier for the printing-plates or stencils, inking means associated with the carrier and an impression-platen arranged laterally and adjacent to the periphery of the carrier and between which and the periphery of the carrier the magazines are dropped, substantially as described.

6. In combination in an addressing-machine, a rotary carrier for the printing-plates or stencils, inking means associated with the rotary carrier including an ink-pad on the carrier, a platen arranged to one side of the periphery of the carrier and means for automatically conveying the magazines to the carrier and at a point above the platen to drop thereupon, and pass between the said platen and the carrier for the impression, substantially as described.

7. In an addressing-machine, a rotary carrier for the stencils, means for conveying and discharging the magazines to the carrier, said means being directed to the side periphery of the carrier, and impression means to receive the magazine as discharged, said means consisting of a platen arranged below the point of discharge and between which platen and the carrier the magazines and stencils pass, substantially as described.

8. In an addressing-machine, a rotary carrier for the stencils or printing-plates, an inking-pad supported on the carrier and adapted to move radially, an impression-platen adjacent the periphery of the carrier and means for moving the inking-pad outwardly on the carrier as the stencil and magazine pass the impression-platen, substantially as described.

9. In an addressing-machine, a rotary carrier for the stencils or printing-plates, an inking-pad supported on the carrier and adapted to move radially, an impression-platen adjacent the periphery of the carrier and means for moving the inking-pad as the stencil and magazine pass the impression-platen, said means consisting of a roller within the drum over which the block of the inking-pad passes to be forced out thereby, substantially as described.

10. In combination, a rotary carrier, means thereon for gripping the printing-plates or stencils, an impression-platen arranged to discharge the magazine downwardly from between itself and the carrier, means for receiving the magazines as they fall by gravity, a plate upon which the stencils are received, to be held separate from the magazines, and means for operating the grippers to release the stencils when they reach a certain point, substantially as described.

11. In combination, a rotary carrier for the stencils, a drive-shaft, gearing between the said drive-shaft and the carrier to give a part-revolution to the carrier for each revolution of the drive-shaft, a rotary drum having a clutch connection with the drive-shaft, a lever for controlling the clutch, means operated by the magazines for retracting the said clutch-lever to allow the clutch to start the shaft and carrier from a position of rest, substantially as described.

12. In combination, a rotary carrier having a plurality of gripping means disposed about its periphery at equal distances apart, a drive-shaft for imparting to the carrier a movement equal to the distance between the individual gripper means at each revolution of the said shaft, a clutch for driving the said shaft, a clutch-lever and means operated by the magazines to control the clutch-lever to start the rotary carrier when the magazine is fed thereto, substantially as described.

13. In combination in a machine of the class described, a rotary carrier, a clutch for driving the same, a clutch-lever for releasing the clutch, controlling means in the path of the magazines for moving the clutch-lever when struck by the magazines to start the rotary carrier from a position of rest, and means for maintaining the clutch-lever retracted for a specified time, substantially as described.

14. In combination in a machine of the class described, a rotary carrier, a clutch for driving the same, a clutch-lever for releasing the clutch, controlling means in the path of the magazines for moving the clutch-lever to its retracted position when struck by the magazines to start the rotary carrier, and means for maintaining the clutch-lever retracted, said maintaining means consisting of a ring rotating with the clutch and upon which a part of the clutch-lever rides when retracted, said ring having a cut-away part to allow the clutch-lever to move to operative position if no magazine is fed when said notch reaches the appropriate part of the clutch-lever, substantially as described.

15. In combination in a machine of the class described, a rotary carrier for the stencils or other articles, impression means, a drive-shaft, connections between the drive-shaft and the rotary carrier including a clutch, means for controlling the clutch to start the rotary carrier when a magazine is fed to the carrier, a crank-disk on the drive-shaft, inking means and a connection from said inking means to the crank-disk, substantially as described.

16. In combination in a machine of the class described, a rotary carrier for the printing-plates, means for feeding magazines to the carrier, a drive-shaft for the carrier, a clutch between the said drive-shaft and the rotary carrier, a clutch-lever controlled by the magazines to start the rotary carrier when a magazine is fed, inking mechanism and a connection between the said drive-shaft and the said inking mechanism, substantially as described.

17. In combination, a rotary carrier, a holder for receiving the stencils therefrom, a reciprocating packing device for packing the stencils together, detent means and means for driving the said reciprocating packer and the rotary carrier, said means being controlled by the presence of the magazine to be addressed, substantially as described.

18. In combination, a rotary carrier, a holder to receive the stencils as discharged therefrom, a reciprocating packer for packing the stencils together, a rock-shaft, inking means, means for driving the rotary carrier, a connection between the said means and the rock-shaft which drives the reciprocating packer and a connection between the said rock-shaft and the inking means, substantially as described.

19. In combination in a machine of the class described, a carrier for the stencils, holding means for receiving the stencils therefrom consisting of a trough and a projection in the said trough flush with one part of the bottom thereof, and having a crevice between itself and adjacent portions of the trough whereby a removable trough may be inserted to receive the stencils as they pass over the said projection, substantially as described.

20. In combination in a machine of the class described, means for carrying the stencils, impression means, a table or support upon which the magazines are discharged and a variable delivery means associated with the said table and moving thereover to discharge the magazine therefrom, substantially as described.

21. In combination in a machine of the class described, carrier means, means for supplying stencils thereto individually, impression means, variable delivery means for the magazines and controlling means for the variable delivery means, said controlling means acting on the stencils while held on the carrier means, substantially as described.

22. In combination in a machine of the class described, carrier means, a table to receive the addressed magazines, a delivery-arm adapted to sweep over the said table to discharge the magazines at a plurality of points and means for operating and controlling the said arm, said means being in turn controlled by the thickness of the stencils, substantially as described.

23. In combination in a machine of the class described, a carrier for the stencils, impression means, a support or table for receiving the addressed magazines, a delivery-arm adapted to sweep the said table to discharge the magazines at a plurality of points, drive means for the carrier, a crank-disk thereon having a clutch connection therewith, a connection between the said crank-disk and the delivery-arm and means operated by a stencil of extra thickness for controlling the said clutch, substantially as described.

24. In combination in a machine of the class described, a carrier for the stencils, a detector means arranged adjacent the periphery of the said carrier to bear on the stencils and to operate automatically when the stencils are absent to give indication of this fact, substantially as described.

25. In combination in a machine of the class described, a carrier for the stencils, a detector arranged adjacent the periphery of the said carrier to operate automatically when the stencils are absent, a signal and means for operating the said signal from the detector, substantially as described.

26. In combination in a machine of the class described, a carrier for the stencils and impression means, variable-delivery means for delivering the magazines at a plurality of points according to States, counties and the like, a detector arranged adjacent the periphery of the carrier, a clutch for changing the delivery operated from the said detector and a signal to be operated when the clutch is operated, substantially a described.

27. In combination, a carrier, a detector arranged adjacent the surface thereof to ride on the stencils, a variable-delivery means, drive means for the magazine including a constantly-rotating part, a crank-disk, a clutch controlling the operation of the said crank-disk, connection between the crank-disk and the delivery means, a clutch-lever operated by a detector for controlling the said clutch, the said crank-disk having a cam-shaped portion, a member carried by the constantly-operating part to ride on the said cam-shaped portion of the crank-disk when the latter is stationary due to the release of the clutch, and a signal operated by the said movable member, substantially as described.

28. In combination in a machine of the class described, a carrier, a variable delivery for the magazines, means for changing the said delivery including a clutch and a detector arranged adjacent the surface of the carrier and having a clutch-lever controlled thereby to operate the clutch, a signal to be operated when the said clutch is operated to change the delivery, a second signal to be operated when there are no stencils passing the detector and means for controlling the said signal from the clutch-lever, substantially as described.

29. In combination in a machine of the class described, a carrier for the stencils, impression means, a detector arranged adjacent the surface of the carrier, a constantly-operating part carrying means for making a signal, signal devices, the said signal devices and the means on the constantly-operating part for operating it being normally out of alinement and means for throwing them into alinement controlled by the detector means, substantially as described.

In testimony whereof we affix our signatures in presence of two witnesses.

CHARLES OWENS.
ULYSSES GRANT LEE.

Witnesses to signature of Chas. Owens:
FRANK CHAPMAN,
A. A. CHAPMAN.

Witnesses to signature of U. G. Lee:
ALEX LYLE,
C. C. PARIS.